（12）United States Patent
Hori et al.

(10) Patent No.: US 8,814,561 B2
(45) Date of Patent: Aug. 26, 2014

(54) METHOD AND APPARATUS FOR CONTROLLING OPERATION OF OXYFUEL COMBUSTION BOILER

(71) Applicant: IHI Corporation, Tokyo (JP)

(72) Inventors: Tetsuya Hori, Tokyo (JP); Toshihiko Yamada, Tokyo (JP); Yohei Akutsu, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 13/943,000

(22) Filed: Jul. 16, 2013

(65) Prior Publication Data

US 2013/0302739 A1 Nov. 14, 2013

Related U.S. Application Data

(63) Continuation of application No. PCT/JP2012/000142, filed on Jan. 12, 2012.

(30) Foreign Application Priority Data

Jan. 17, 2011 (JP) .................................. 2011-006686

(51) Int. Cl.
*F23N 3/00* (2006.01)
*F22B 35/00* (2006.01)
*F23L 7/00* (2006.01)
*F23N 5/00* (2006.01)

(52) U.S. Cl.
CPC ............. *F23N 3/002* (2013.01); *F23N 2037/26* (2013.01); *F22B 35/00* (2013.01); *F23L 7/007* (2013.01); *F23N 5/006* (2013.01); *F23N 2037/28* (2013.01); *Y02E 20/344* (2013.01); *F23N 2033/02* (2013.01)
USPC ................... 431/12; 431/9; 431/10; 431/116; 110/188; 110/204; 110/344

(58) Field of Classification Search
USPC .......... 431/12, 9, 10, 115, 116; 110/188, 186, 110/204, 205, 344, 345; 73/23.31, 23.32
See application file for complete search history.

(56) References Cited

U.S. PATENT DOCUMENTS

| 8,490,556 | B2 * | 7/2013 | Yamada et al. ............... 110/341 |
| 8,550,016 | B2 * | 10/2013 | Terushita et al. ............. 110/188 |
| 8,550,017 | B2 * | 10/2013 | Terushita et al. ............. 110/204 |
| 2009/0277363 | A1 | 11/2009 | Shibata et al. | |

FOREIGN PATENT DOCUMENTS

| JP | 01-131813 A | 5/1989 |
| JP | 2001-336736 A | 12/2001 |
| JP | 2009-270753 A | 11/2009 |

OTHER PUBLICATIONS

International Search Report mailed on Apr. 24, 2012 for PCT/JP2012/000142 filed Jan. 12, 2012 with English Translation.

* cited by examiner

*Primary Examiner* — Alfred Basichas
(74) *Attorney, Agent, or Firm* — Oblon, Spivak, McClelland, Maier & Neustadt, L.L.P.

(57) ABSTRACT

Stable operation of oxyfuel combustion boiler is ensured and amplification in likelihood of or downsizing of forced draft fan is attained. Upon change of commanded boiler load from start value to target value by target time, a feed amount of oxygen from oxygen producing device is regulated for attainment of oxygen concentration on entry side of the boiler body from reference value to attainment point or target entry-side oxygen concentration within entry-side oxygen concentration regulation range by target time. After attainment to attainment point, control is made to return entry-side oxygen concentration to reference value at return point. Airflow rate of forced draft fan is controlled with change rate smaller than change rate with which air flow rate of forced draft fan reaches target value by target time.

4 Claims, 6 Drawing Sheets

(a)

(b)

(c)

(a)

(b)

(c)

(a)

(b)

(c)

(a)

(b)

(c)

METHOD AND APPARATUS FOR CONTROLLING OPERATION OF OXYFUEL COMBUSTION BOILER

TECHNICAL FIELD

The present invention relates to a method and an apparatus for controlling an operation of an oxyfuel combustion boiler.

BACKGROUND ART

It has been nowadays desired to reduce emission of greenhouse gases such as carbon dioxide to prevent global warming. Techniques are being developed for recovering carbon dioxide in an exhaust gas from a boiler body so as to dispose the same in the ground or in an ocean.

Thus, an oxyfuel combustion boiler system has been proposed which is suitable for recovery of carbon dioxide in exhaust gas from an oxyfuel combustion boiler and disposal of the same in the ground or in an ocean (Patent Literature 1). In the oxyfuel combustion boiler system disclosed in Patent Literature 1, exhaust gas is drawn at a position downstream of an exhaust gas treatment equipment and upstream of a carbon dioxide separation equipment through an exhaust gas recirculation line. The drawn exhaust gas is fed by a recirculation fan (forced draft fan) to burners of the boiler and through a coal pulverizing mill to the burners.

CITATION LIST

Patent Literature

[Patent Literature 1] JP 2009-270753A

SUMMARY OF INVENTION

Technical Problems

With respect to the conventional oxyfuel combustion boiler system in Patent Literature 1, FIGS. 1 and 2 show general controls upon increase and decrease of a commanded boiler load on the basis of commanded output in MWD, respectively. When the commanded boiler load is varied from start values A to target values A1 and A2 as shown in FIG. 1(a) and FIG. 2(a) by increase and decrease commands W1 and W2, respectively, firstly a flow rate of oxygen from a highly-purified oxygen producing device is regulated to make an exit-side oxygen concentration of the boiler body equal to a preset exit-side oxygen concentration; and then an airflow rate of a forced draft fan shown in FIGS. 1(c) and 2(c) which is a circulation flow rate of exhaust gas is regulated for attainment from start values F to target values F1 and F2 of the airflow rate by the target times T1 and T2, respectively, so as to make an entry-side oxygen concentration of the boiler body equal to a preset entry-side oxygen concentration (i.e., so as to retain the entry-side oxygen concentration to a preset constant value X as shown in FIG. 1(b) and FIG. 2(b)).

In the oxyfuel combustion boiler system disclosed in the above Patent Literature 1, in order to retain the entry-side oxygen concentration to the preset constant value X, the flow rate of the forced draft fan is regulated for attainment from the start values F to the target values F1 and F2 of the airflow rate by the target times T1 and T2, respectively. There is time delay in control of the airflow rate of the forced draft fan, so that look-ahead control anticipating the time delay is performed for attainment of control to the target values F1 and F2 of the airflow rate by the target times T1 and T2, respectively.

Due to such look-ahead control, excessive airflow rate is already fed as shown in FIG. 1(c) at the target time T1 for attainment of the target value F1 of the airflow rate; thus, a problem of the excessive airflow rate called overshoot S occurs even if the airflow rate of the forced draft fan is regulated to the target value F1 of the airflow rate at this time point. Likewise, as shown in FIG. 2(c), the airflow rate lacks at the target time T2 for attainment of the target value F2 of the airflow rate; thus, a problem of the lacking airflow rate called undershoot S' occurs even if the airflow rate of the forced draft fan is regulated to the target value F2 of the airflow rate at this time point.

Such occurrence of the overshoot S or the undershoot S' with respect to the airflow rate of the forced draft fan results in failure of stable operation of the forced draft fan. The overshoot S occurring on the forced draft fan upon increase of the commanded boiler load to a maximum causes likelihood (latitude) of the forced draft fan to reach a criminal limit, failing in stable operation. This problem may be overcome by designing a forced draft fan having likelihood calculating on the overshoot S; generally conducted is use of a larger-sized forced draft fan.

The invention was made in view of the above and has its object to provide a method and an apparatus for controlling an operation of an oxyfuel combustion boiler which enables stable operation of the boiler and can attain amplification in likelihood of or downsizing of the forced draft fan.

Solution to Problems

The invention is directed to a method for controlling an operation of an oxyfuel combustion boiler wherein part of exhaust gas on an exit side of a boiler body is fed as recirculation gas by a forced draft fan to an entry side of the boiler body, oxygen produced by an oxygen producing device being fed to the entry side of the boiler body so as to effect oxyfuel combustion, the method comprising regulating a feed amount of oxygen from the oxygen producing device depending on increase/decrease of a commanded boiler load for attainment of an entry-side oxygen concentration on the entry side of the boiler body from a reference value to an attainment point or target entry-side oxygen concentration within an entry-side oxygen concentration regulation range by a target time upon change of the commanded boiler load from a start value to a target value by the target time, and regulating an airflow rate of a forced draft fan for attainment from a start value to a target value of the airflow rate with a change rate which is smaller than a change rate with which in turn the target value of the airflow rate is attained by the target time.

In the method for controlling the operation of the oxyfuel combustion boiler, after the attainment of the entry-side oxygen concentration to the attainment point or target entry-side oxygen concentration by the target time, control is made to return the entry-side oxygen concentration to the reference value at a return point after the target time, and is made to retain the smaller change rate of the airflow rate of the forced draft fan after the target time such that the airflow rate reaches the target value of the airflow rate at the return point of the entry-side oxygen concentration reaching the target entry-side oxygen concentration.

In the method for controlling the operation of the oxyfuel combustion boiler, after the attainment of the entry-side oxygen concentration to the attainment point or target entry-side oxygen concentration by the target time, control is made to retain as the target entry-side oxygen concentration the entry-side oxygen concentration at the target time, and is made to retain the airflow rate of the forced draft fan attained with the smaller change rate at the target time as the target value of the airflow rate.

The invention is also directed to an apparatus for controlling an operation, of an oxyfuel combustion boiler wherein part of exhaust gas on an exit side of a boiler body is fed as recirculation gas by a forced draft fan to an entry side of the boiler body, oxygen produced by an oxygen producing device being fed to the entry side of the boiler body so as to effect oxyfuel combustion, the apparatus comprising a controller to which inputted are an entry-side oxygen concentration signal from an oxygen concentration meter for measuring an entry-side oxygen concentration on an entry side of the boiler body, a commanded boiler load and an entry-side oxygen concentration regulation range, the controller regulating a feed amount of oxygen from the oxygen producing device depending on increase/decrease of a commanded boiler load for attainment of an entry-side oxygen concentration on the entry side of the boiler body from a reference value to an attainment point or target entry-side oxygen concentration within an entry-side oxygen concentration regulation range by a target time when the load is varied from a start value to a target value by the target time, control after the attainment of the entry-side oxygen concentration to the attainment point or target entry-side oxygen concentration by the target time being made to return the entry-side oxygen concentration to the reference value at a return point after the target time, and being made to regulate an airflow rate of a forced draft fan for attainment from a start value to a target value of the airflow rate with a change rate which is smaller than a change rate with which in turn the target value of the airflow rate is attained by the target time, or control after the attainment of the entry-side oxygen concentration to the attainment point or target entry-side oxygen concentration by the target time being made to retain as the target entry-side oxygen concentration the entry-side oxygen concentration at the target time, and being made to retain the airflow rate of the forced draft fan attained with the smaller change rate at the target time as the target value of the airflow rate.

Advantageous Effects of Invention

According to the method and the apparatus for controlling the operation of the oxyfuel combustion boiler of the invention, the entry-side oxygen concentration on the entry side of the boiler body is regulated within the entry-side oxygen concentration regulation range when the commanded boiler load is varied, so that the airflow rate of the forced draft fan can be controlled with the small change rate, and thus the overshoot or the undershoot occurred upon attainment of the airflow rate of the forced draft fan to the target value of the airflow rate can be substantially restrained to a lower level than ever before. Thus, excellent effects that stable operation of the oxyfuel combustion boiler is enabled and that amplification in likelihood of or downsizing of the forced draft fan can be attained can be obtained.

Figure 1:
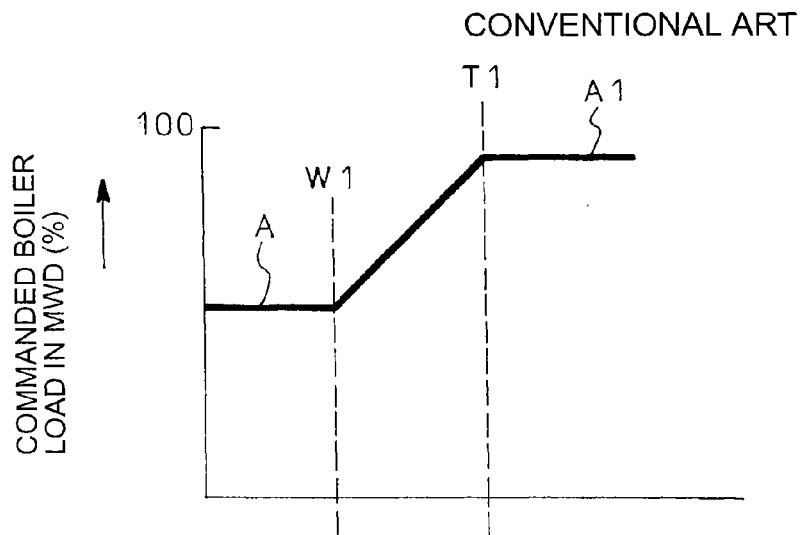
FIG. 1 shows a control method for a conventional oxyfuel combustion boiler system for increase of a commanded boiler load in which (a) is a diagram showing commanded boiler load increased from a start value to a target value, (b) is a diagram showing a preset entry-side oxygen concentration and (c) is a diagram showing an airflow rate of a forced draft fan increased from a start value to a target value of the airflow rate.
Figure 1:
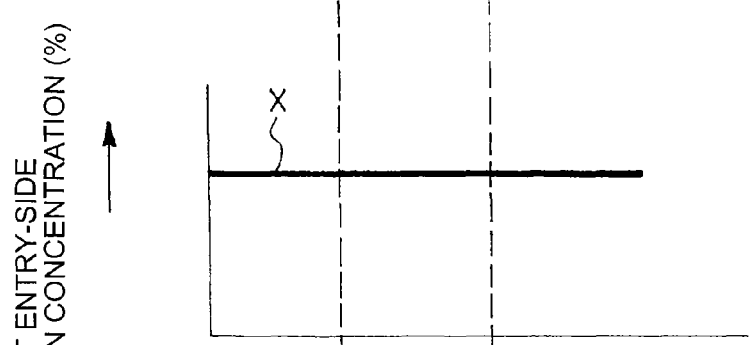
Figure 1:
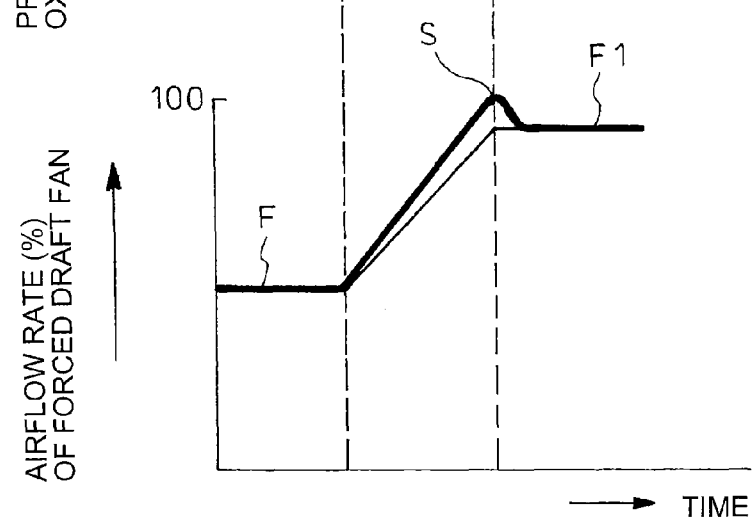
Figure 2:
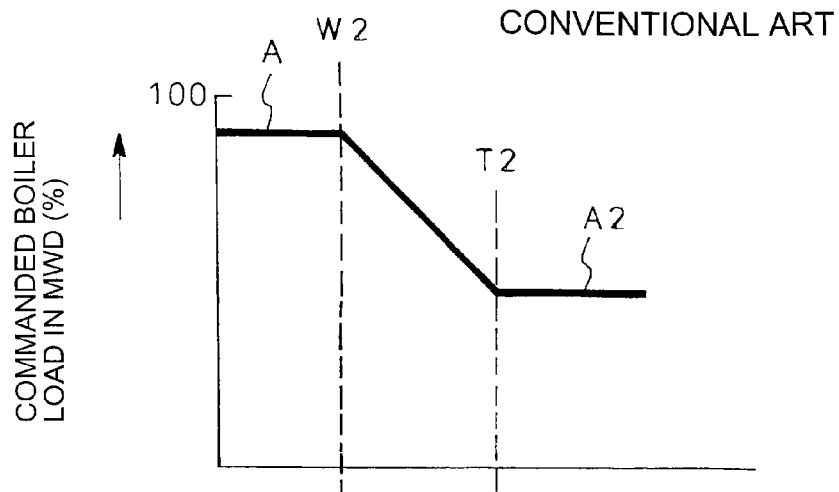
FIG. 2 shows a control method for the conventional oxyfuel combustion boiler system for decrease of the commanded boiler load in which (a) is a diagram showing the commanded boiler load decreased from a start value to a target value, (b) is a diagram showing the preset entry-side oxygen concentration and (c) is a diagram showing the airflow rate of the forced draft fan decreased from a start value to a target value of the airflow rate.
Figure 2:
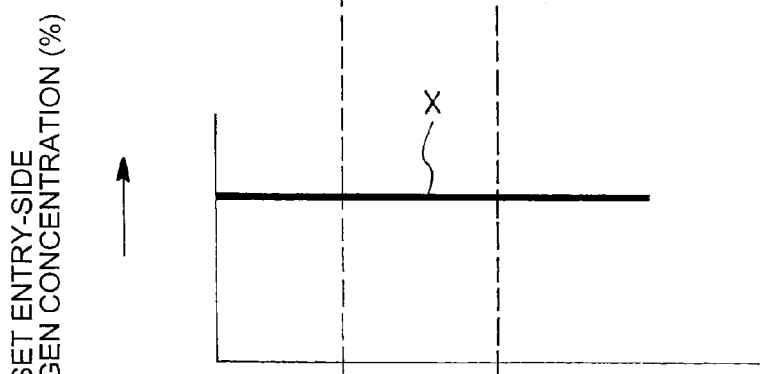
Figure 2:
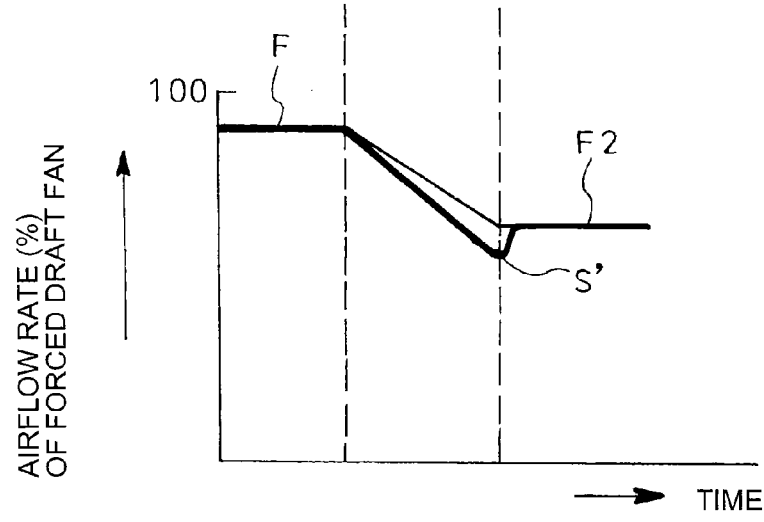

REFERENCE SIGNS LIST 1 boiler body
7 forced draft fan
8 oxygen producing device
19 controller
20 oxygen concentration meter
21 entry-side oxygen concentration signal
22 commanded boiler load
23 entry-side oxygen concentration regulation range
A start value
A1, A2 target value
B reference value
B' attainment point
B1, B2 target entry-side oxygen concentration
B" return point
C1, C2 change rate
C1', C2' change rate
F start value
F1, F2 target value of airflow rate
T1, T2 target time

DESCRIPTION OF EMBODIMENT

Next, an embodiment of the invention will be described in conjunction with the drawings.

Figure 3:
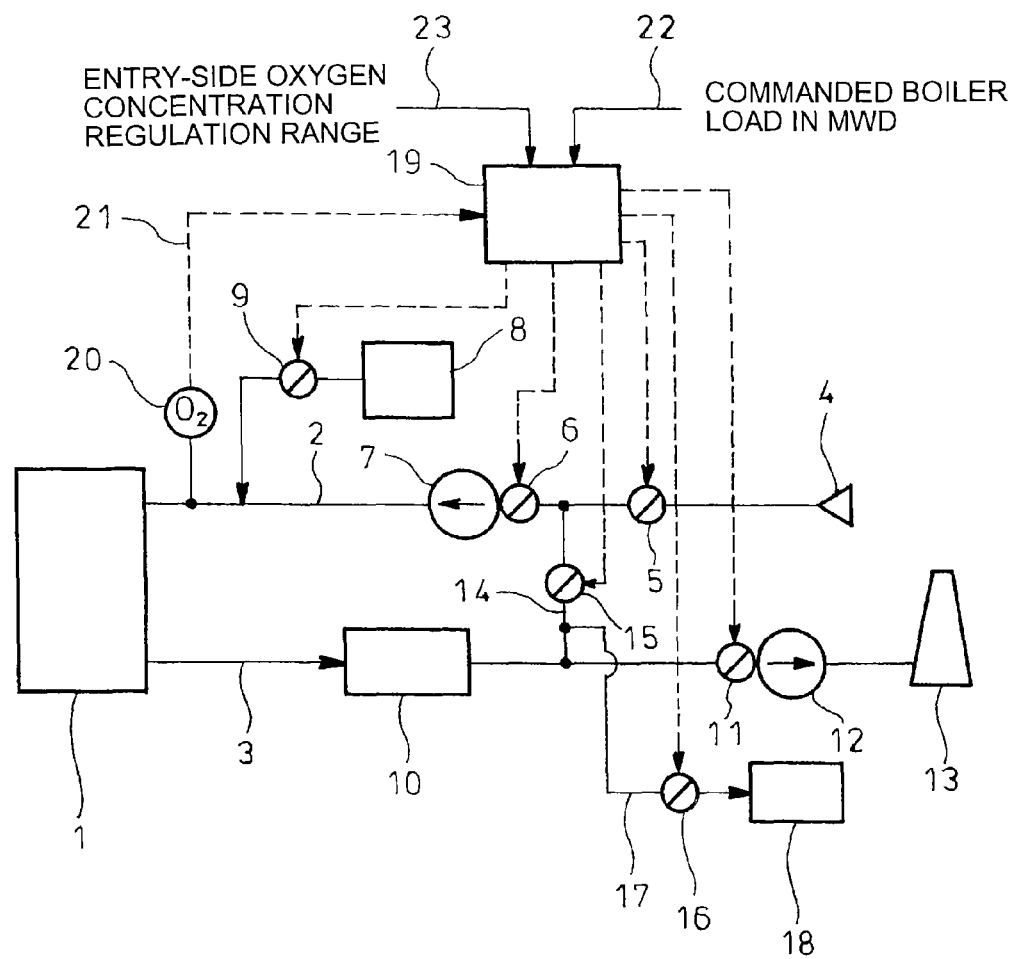
FIG. 3 is a block diagram showing an apparatus for controlling an oxyfuel combustion boiler which is an embodiment of the invention.

FIG. 3 is a block diagram showing an apparatus for controlling an operation of an oxyfuel combustion boiler which is an embodiment of the invention. In FIG. 3, reference numeral 1 denotes a boiler body; 2, an entry-side duct; and 3, an exit-side duct. The entry-side duct 2 serves to feed air taken through an air intake port 4 to the boiler body 1 via an air intake damper 5 and a forced draft fan 7 with a guide vane 6. Fed to the entry-side duct 2 downstream of the forced draft fan 7 is an oxygen from an oxygen producing device 8 by an oxygen feed damper 9. At start-up of the boiler body 1, combustion is conducted with air taken through the air intake port 4; after the boiler body 1 is enhanced in temperature, the air intake damper 5 is throttled while the oxygen feed damper 9 is opened to feed the oxygen from the oxygen producing device 8, and a circulation damper 15 to be referred to hereinafter is opened to recirculate the exhaust gas. Thus, changeover to oxyfuel combustion is made.

The exit-side duct 3 serves to guide the exhaust gas from the boiler body 1 to a stack 13 through the exhaust gas treatment equipment 10 and an induced draft fan 12 with a guide vane 11.

The exit-side duct 3 is connected on an exit side of the exhaust gas treatment equipment 10 to the entry-side duct 2 on an entry side of the forced draft fan 7 through a circulation duct 14 including a circulation damper 15 to recirculate the exhaust gas from the exit side of the exhaust gas treatment equipment 10 to the entry side of the forced draft fan 7. Part of the exhaust gas in the circulation duct 14 on an entry side of the circulation damper 15 is fed through an exhaust-gas discharge duct 17 with a discharge damper 16 to a carbon dioxide treatment equipment 18 where carbon dioxide is taken out through, for example, liquefaction. The air intake damper 5 is totally closed in such a steady operation of oxyfuel combustion, i.e., when the oxygen feed damper 9 is opened for feed of the oxygen and the circulation damper 15 is opened for recirculation of the exhaust gas.

In FIG. 3, reference numeral 19 denotes a controller. Inputted to the controller 19 are entry-side oxygen concentration signal 21 from an oxygen concentration meter 20 which measures the entry-side oxygen concentration on the entry side of the boiler body 1, a commanded boiler load 22 on the basis of a commanded output in MWD and a preset entry-side oxygen concentration regulation range 23. Though not shown in FIG. 3, a feed amount of fuel to the boiler body 1 is controlled on the basis of the commanded boiler load 22, so that the oxygen is fed by the oxygen feed damper 9 to the entry-side duct 2 in a controlled amount depending on the feed amount of the fuel on the basis of the commanded boiler load 22.

The above-mentioned entry-side oxygen concentration regulation range 23 is an oxygen concentration range on the entry side to the boiler within which stable oxyfuel combustion is ensured and which has been ascertained by tests conducted by the inventors. It has been ascertained that the entry-side oxygen concentration regulation range 23 is preferably an oxygen concentration of 24%-30%.

The inventors conducted furnace analysis tests for determining furnace heat absorption in oxyfuel combustion with the entry-side oxygen concentration being varied, and compared the result with furnace heat absorption in stable air combustion (21% $O_2$). Here, the oxygen fed from the oxygen producing device 8 to the boiler body 1 by the oxygen feed damper 9 is controlled depending upon the fuel fed to the boiler body 1. Thus, the variation of the entry-side oxygen concentration is conducted by opening the circulation damper 15 and by controlling the airflow rate of the forced draft fan 7 through the guide vane 6 to regulate the recirculated amount of the exhaust gas. That is, in order to increase and decrease the entry-side oxygen concentration, the recirculated amount of the exhaust gas by the forced draft fan 7 is decreased and increased, respectively.

Figure 6:
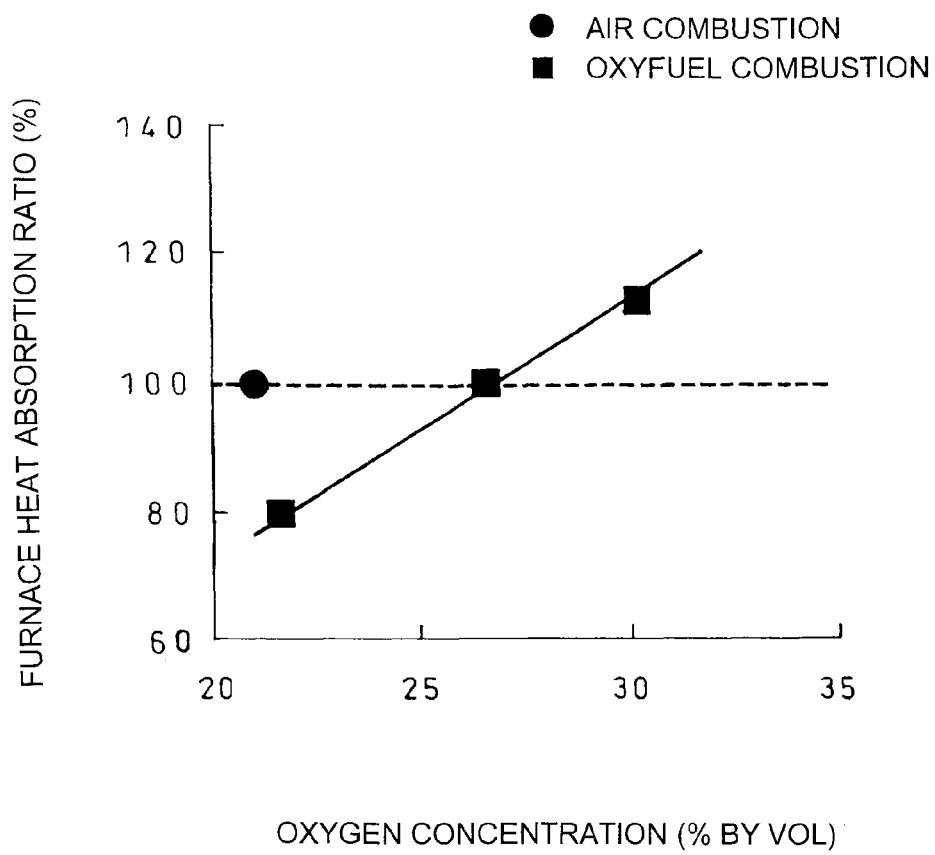
FIG. 6 is a graph showing a result of furnace analytic tests for comparison between furnace heat absorption in oxyfuel combustion with the entry-side oxygen concentration being varied and that in stable air combustion.

As the result of the above testes, it was ascertained as shown in FIG. 6 that the furnace heat absorption by combustion with the oxygen concentration of the order of 27% is equivalent to the furnace heat absorption (regarded as 100%) upon the stable air combustion. The combustion tests in the boiler furnace 1 revealed that the flame with the oxygen concentration of the order of 27% has luminance and temperature equivalent to those of the flame upon the stable air combustion.

It was confirmed that when the entry-side oxygen concentration is made lower than 24%, the flame becomes dark and deteriorated in combustibleness, resulting in increase of unburned coal and significant production of CO. It was also confirmed that when the entry-side oxygen concentration is made higher than 30%, the recirculation amount of the exhaust gas is reduced as mentioned in the above; an amount of the gas passing through the boiler body 1 is reduced so that the burner used as in the air combustion has an increased possibility of the flame being blown out, resulting in difficulties in stably retaining the flame. Thus, according to invention, the entry-side oxygen concentration regulation range 23 is set to 24%-30%.

Then, the controller 19 controls the feed amount of the oxygen by the oxygen feed damper 9 and the airflow rate of the forced draft fan 7 by the guide vane 6 on the basis of the commanded boiler load 22, the entry-side oxygen concentration signal 21 from the oxygen concentration meter 20 and the entry-side oxygen concentration regulation range 23. The controller 19 further controls the airflow rate of the induced draft fan 12 by the guide vane 11, the feeding/blocking of the air by the air intake damper 5, the circulation amount of the exhaust gas by the circulation damper 15 and the discharge amount of the carbon dioxide by the discharge damper 16.

Next, a mode of operation of the above embodiment will be described.

Upon increase/decrease of the commanded boiler load 22 on the basis of the commanded output in MWD in steady operation state of the oxyfuel combustion succeeding start-up of the boiler body 1 shown in FIG. 3 with air combustion, the feed amount of the oxygen by the oxygen feed damper 9 and the airflow rate of the forced draft fan 7 by the guide vane 6 (and the recirculation amount of the exhaust gas by opening the circulation damper 15) are controlled as follows.

Figure 4:
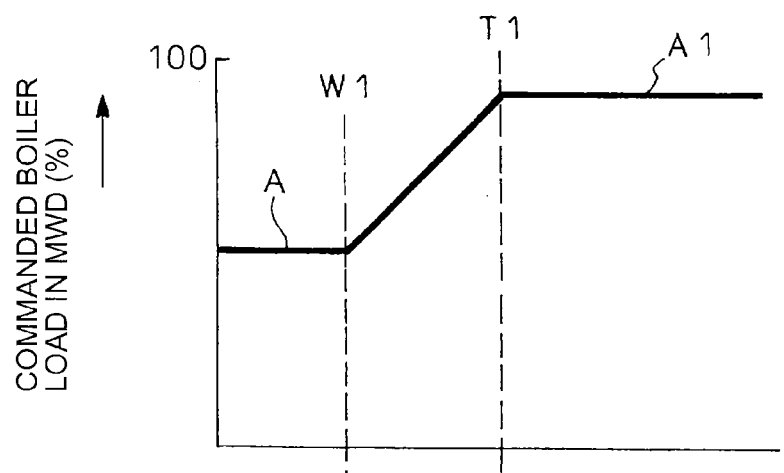
FIG. 4 shows a control method of the invention for increase of a commanded boiler load in which (a) is a diagram showing the commanded boiler load increased from the start value to the target value, (b) is a diagram showing the entry-side oxygen concentration increased from a reference value to a target entry-side oxygen concentration and (c) is a diagram showing the airflow rate of the forced draft fan increased from the start value to the target value of the airflow rate.
Figure 4:
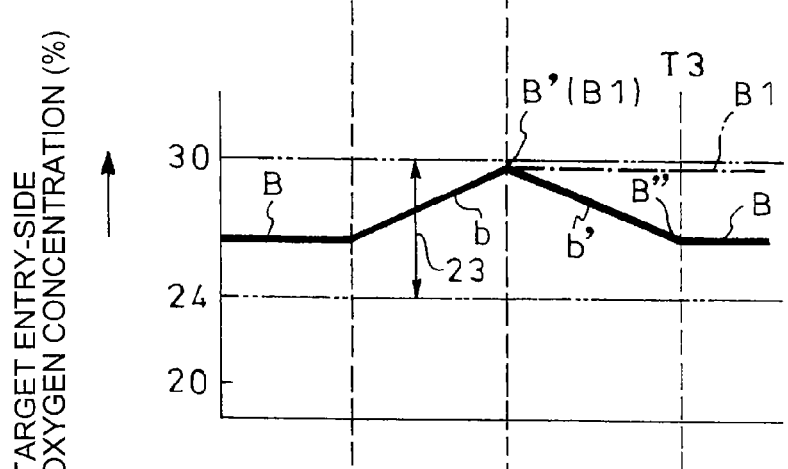
Figure 4:
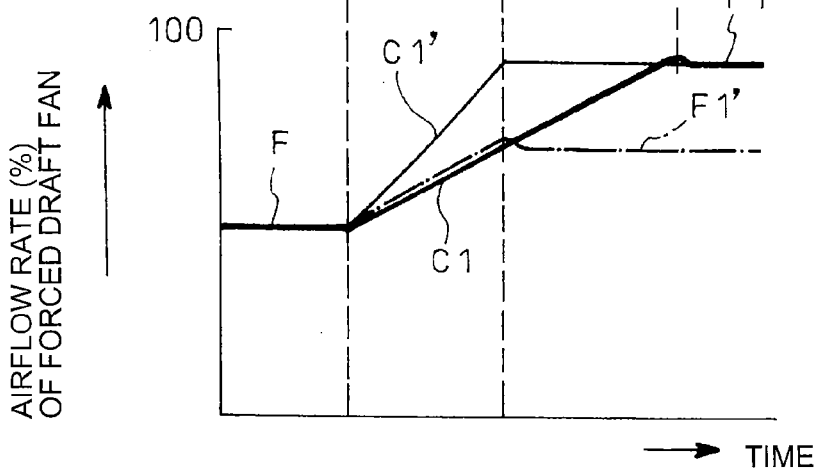

Upon increase of the commanded boiler load by the increase command W1 for attainment from the start value A to the target value A1 by the target time T1 as shown in FIG. 4(*a*), the entry-side oxygen concentration on the entry side of the boiler body 1 is controlled as shown in FIG. 4(*b*) such that the feed amount of the oxygen from the oxygen producing device 8 is increased with a change rate b for attainment from a reference value B to an arrival point B' or target entry-side oxygen concentration B1 within an entry-side oxygen concentration regulation range 23 by the target time T1; after the attainment to the arrival point B', the entry-side oxygen concentration is, for example, decreased with a change rate b' complementary to the change rate b upon the increase to return to the reference value B at a return point B". Thus, the stable combustion in the boiler body 1 is ensured since the entry-side oxygen concentration of the boiler body 1 is retained within the entry-side oxygen concentration regulation range of 24%-30%.

Simultaneously with the above-mentioned control of the entry-side oxygen concentration, the airflow rate of the forced draft fan 7 is controlled as shown in FIG. 4(*c*). Control is such that the airflow rate of the forced draft fan 7 is increased with a change rate C1 for attainment from a start value F to a target value F1 of the airflow rate by an attainment time T3 where the entry-side oxygen concentration in FIG. 4(*b*) is returned to the reference value B at the return point B". The change rate C1 may be substantially smaller than a change rate C1' of the airflow rate of the forced draft fan with which in turn the target value F1 of the airflow rate is attained from the start value F by the target time T1. In this way, the airflow rate of the forced draft fan 7 is gradually increased with the small change rate C1 for attainment of the target value F1 of the airflow rate by the attainment time T3 which is later than the target time T1, so that the overshoot caused can be restrained to a lower level. The reference value B of the entry-side oxygen concentration may be any provided that it is within the entry-side oxygen concentration regulation range 23. The start value A of the commanded boiler load and the start value F of the airflow rate of the forced draft fan 7 may be also any.

Figure 5:
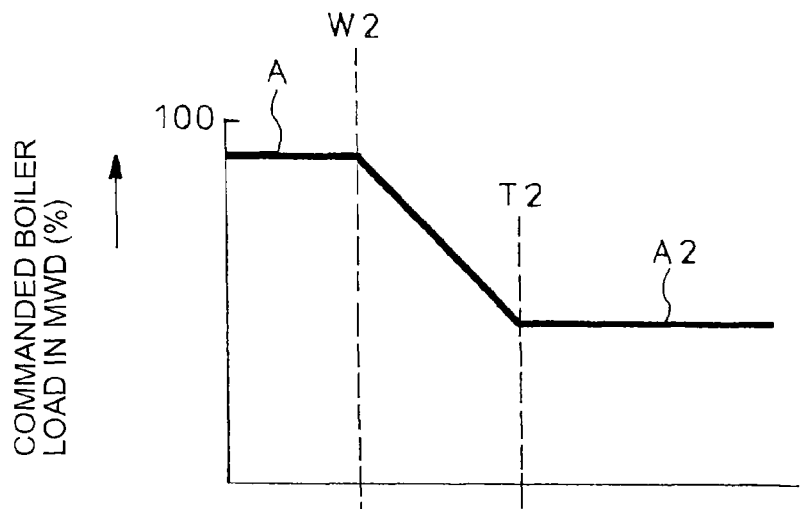
FIG. 5 shows a control method of the invention for decrease of the commanded boiler in which (a) is a diagram showing the commanded boiler load decreased from the start value to the target value, (b) is a diagram showing the entry-side oxygen concentration decreased from the reference value to a target entry-side oxygen concentration and (c) is a diagram showing the airflow rate of the forced draft fan decreased from the start value to the target value of the airflow rate.
Figure 5:
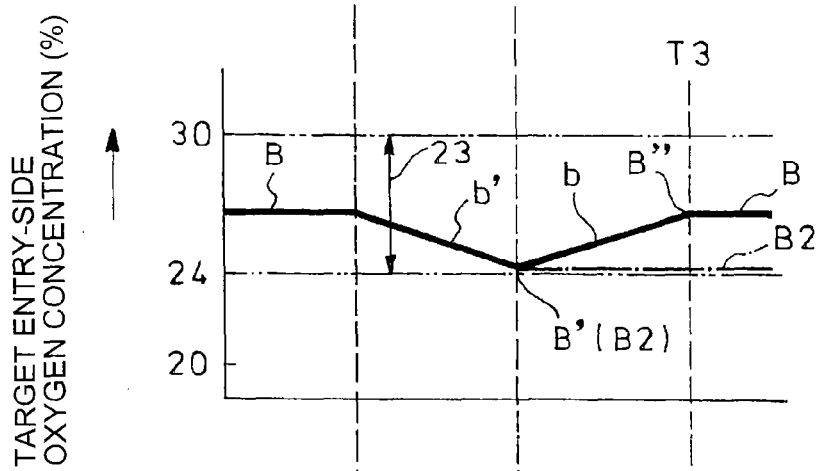
Figure 5:
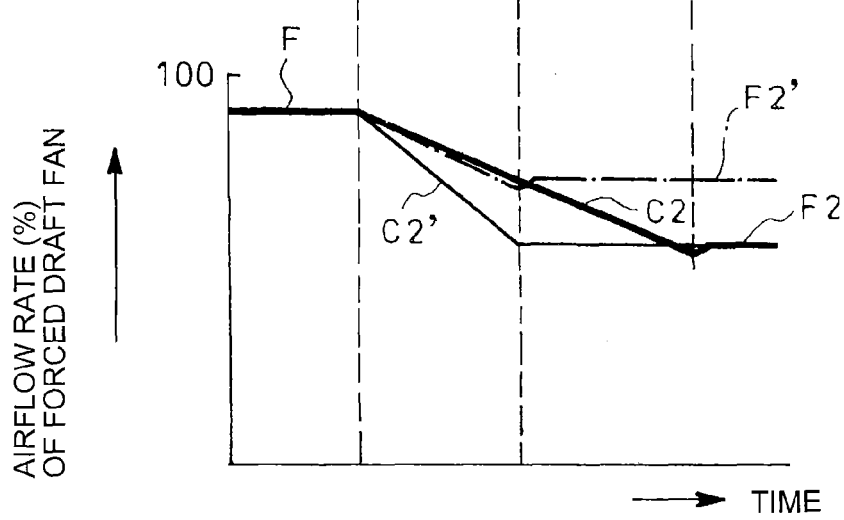

On the other hand, upon decrease of the commanded boiler load by the decrease command W2 for attainment from a start value A to a target value A2 by a target time T2 as shown in FIG. 5(a), the entry-side oxygen concentration on the entry side of the boiler body 1 is regulated as shown in FIG. 5(b) such that the feed amount of the oxygen from the oxygen producing device 8 is decreased with a change rate b' for attainment from a reference value B to an arrival point B' or target entry-side oxygen concentration B2 within the entry-side oxygen concentration regulation range 23 by the target time T2; after the attainment to the arrival point B', the entry-side oxygen concentration is, for example, increased with a change rate b complementary to the change rage b' upon the decrease to return to the reference value B at a return point B".

Simultaneously with the above-mentioned control of the entry-side oxygen concentration, the airflow rate of the forced draft fan 7 is controlled as shown in FIG. 5(c). Control is such that the airflow rate of the forced draft fan 7 is decreased with a change rate C2 for attainment from a start value F to a target value F2 of the airflow rate by the attainment time T3 where the entry-side oxygen concentration in FIG. 5(b) is returned to the reference value B at the return point B". The change rate C2 may be substantially smaller than a change rate C2' of the airflow rate of the forced draft fan with which in turn the target value F2 of the airflow rate is attained from the start value F by the target time T2. In this way, the airflow rate of the forced draft fan 7 is gradually decreased with the small change rate C2 for attainment of the target value F2 of the airflow rate by the attainment time T3 which is later than the target time T2, so that the undershoot caused can be restrained to a lower level.

In the invention, a variant control method similar to the above control method may be carried out.

Specifically, in FIG. 4(b) and FIG. 5(b), after the attainment of the entry-side oxygen concentration from the reference value B to the attainment point B' or target entry-side oxygen concentration B1, B2 is retained as it is as shown by chain line. The airflow rate of the forced draft fan is controlled with a small change rate just like the change rate C1, C2 till the target time T1, T2; after the attainment of the target time T1, T2, control is made to retain the value at the target time T1, T2 as the target value F1', F2' of the airflow rate as shown by chain line. Thus, the occurrence of the overshoot or the undershoot can be restrained to a lower level since the airflow rate of the forced draft fan 7 is varied moderately with the small change rate C1, C2 till the target time T1, T2.

According to the above-mentioned embodiment of the invention, upon the change of the commanded boiler load, the entry-side oxygen concentration on the entry side of the boiler body 1 is regulated within the entry-side oxygen concentration regulation range 23, so that stable combustion can be made even by controlling the airflow rate of the forced draft fan with the small change rate C1, C2. Thus, the overshoot or the undershoot occurring upon attainment of the airflow rate of the forced draft fan to the target value F1, F2, F1', F2' can be substantially restrained to a lower level than ever before. As a result, stable operation of an oxyfuel combustion boiler is enabled and amplification in likelihood of or downsizing of the forced draft fan 7 can be attained.

It is to be understood that a method and an apparatus for controlling an operation of an oxyfuel combustion boiler according to the invention is not limited to the above embodiment and that various changes and modifications may be made without departing from the scope of the invention.

INDUSTRIAL APPLICABILITY

A method and an apparatus for controlling an operation of an oxyfuel combustion boiler according to the invention, which enable control of an airflow rate of a forced draft fan with a small change rate by regulating an entry-side oxygen concentration of a boiler body within an entry-side oxygen concentration adjustable range upon change of a commanded boiler load, can be applied to substantial restraint to a lower level than ever before of an overshoot or an undershoot occurring upon attainment of the airflow rate of the forced draft fan to a target value of the airflow rate.

The invention claimed is:

1. A method for controlling an operation of an oxyfuel combustion boiler wherein part of exhaust gas on an exit side of a boiler body is fed as recirculation gas by a forced draft fan to an entry side of the boiler body, oxygen produced by an oxygen producing device being fed to the entry side of the boiler body so as to effect oxyfuel combustion, the method comprising regulating a feed amount of oxygen from the oxygen producing device depending on increase/decrease of a commanded boiler load for attainment of an entry-side oxygen concentration on the entry side of the boiler body from a reference value to an attainment point or target entry-side oxygen concentration within an entry-side oxygen concentration regulation range by a target time upon change of the commanded boiler load from a start value to a target value by the target time, and regulating an airflow rate of a forced draft fan for attainment from a start value to a target value of the airflow rate with a change rate which is smaller than a change rate with which in turn the target value of the airflow rate is attained by the target time.

2. The method for controlling the operation of the oxyfuel combustion boiler as claimed in claim 1, wherein after the attainment of the entry-side oxygen concentration to the attainment point or target entry-side oxygen concentration by the target time, control is made to return the entry-side oxygen concentration to the reference value at a return point after the target time, and is made to retain the smaller change rate of the airflow rate of the forced draft fan after the target time such that the airflow rate reaches the target value of the airflow rate at the return point of the entry-side oxygen concentration reaching the target entry-side oxygen concentration.

3. The method for controlling the operation of the oxyfuel combustion boiler as claimed in claim 1, wherein after the attainment of the entry-side oxygen concentration to the attainment point or target entry-side oxygen concentration by the target time, control is made to retain as the target entry-side oxygen concentration the entry-side oxygen concentration at the target time, and is made to retain the airflow rate of the forced draft fan attained with the smaller change rate at the target time as the target value of the airflow rate.

4. An apparatus for controlling an operation of an oxyfuel combustion boiler wherein part of exhaust gas on an exit side of a boiler body is fed as recirculation gas by a forced draft fan to an entry side of the boiler body, oxygen produced by an oxygen producing device being fed to the entry side of the boiler body so as to effect oxyfuel combustion, the apparatus comprising a controller to which inputted are an entry-side oxygen concentration signal from an oxygen concentration meter for measuring an entry-side oxygen concentration on an entry side of the boiler body, a commanded boiler load and an entry-side oxygen concentration regulation range, the controller regulating a feed amount of oxygen from the oxygen producing device depending on increase/decrease of a commanded boiler load for attainment of an entry-side oxygen concentration on the entry side of the boiler body from a reference value to an attainment point or target entry-side oxygen concentration within an entry-side oxygen concentration regulation range by a target time when the load is varied from a start value to a target value by the target time, control after the attainment of the entry-side oxygen concentration to the attainment point or target entry-side oxygen concentration by the target time being made to return the entry-side oxygen concentration to the reference value at a return point after the target time, and being made to regulate an airflow rate of a forced draft fan for attainment from a start value to a target value of the airflow rate with a change rate which is smaller than a change rate with which in turn the target value of the airflow rate is attained by the target time, or control after the attainment of the entry-side oxygen concentration to the attainment point or target entry-side oxygen concentration by the target time being made to retain as the target entry-side oxygen concentration the entry-side oxygen concentration at the target time, and being made to retain the airflow rate of the forced draft fan attained with the smaller change rate at the target time as the target value of the airflow rate.

* * * * *